US011866970B2

(12) United States Patent
Jeffery et al.

(10) Patent No.: US 11,866,970 B2
(45) Date of Patent: Jan. 9, 2024

(54) FABRIC TREATMENT MACHINE HINGE SPACER

(71) Applicant: Whirlpool Corporation, Benton Harbor, MI (US)

(72) Inventors: James Jeffery, St. Joseph, MI (US); Nicholas Schooley, Coloma, MI (US); David Walter, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 330 days.

(21) Appl. No.: 17/113,213

(22) Filed: Dec. 7, 2020

(65) Prior Publication Data

US 2022/0178184 A1 Jun. 9, 2022

(51) Int. Cl.

| | |
|---|---|
| ***E05D 11/00*** | (2006.01) |
| ***E05D 5/14*** | (2006.01) |
| ***D06F 39/14*** | (2006.01) |

(52) U.S. Cl.
CPC .............. *E05D 11/00* (2013.01); *D06F 39/14* (2013.01); *E05D 5/14* (2013.01); *E05Y 2900/312* (2013.01)

(58) Field of Classification Search
CPC ... D06F 39/14; E05D 5/14; E05D 2011/0072; E05Y 2900/312
See application file for complete search history.

(56) References Cited

U.S. PATENT DOCUMENTS

| | | | | |
|---|---|---|---|---|
| 3,921,254 | A | 11/1975 | Foster, Jr. et al. | |
| 4,863,062 | A | 9/1989 | Holliday | |
| 7,090,095 | B2 | 8/2006 | Schafer | |
| 7,513,131 | B2 | 4/2009 | Kim | |
| 8,322,171 | B2 | 12/2012 | Sung | |
| 8,511,115 | B2 | 8/2013 | Kim et al. | |
| 9,464,376 | B2 | 10/2016 | Kim | |
| 2008/0295544 | A1 | 12/2008 | Cho et al. | |
| 2018/0266156 | A1* | 9/2018 | Mora ......................... | E06B 3/38 |
| 2020/0039317 | A1* | 2/2020 | Kuroda ................ | B60G 21/055 |

FOREIGN PATENT DOCUMENTS

| | | | |
|---|---|---|---|
| CN | 106702689 | A | 5/2017 |
| KR | 100847555 | B1 | 7/2008 |

* cited by examiner

*Primary Examiner* — Matthew W Ing
(74) *Attorney, Agent, or Firm* — Harness, Dickey & Pierce, PLC

(57) ABSTRACT

A fabric treatment machine has a cabinet housing. A lid enables access inside the cabinet. Fabric treatment components such as a drum are positioned inside the cabinet housing. A panel on the cabinet housing includes an opening to receive the lid. At least one hinge spacer couples with the panel to receive a shaft of a slow close hinge on the lid. The at least one hinge spacer includes a socket portion and a flange portion. The socket portion inserts into an aperture in the panel. The socket portion includes a bore with at least one flat side to receive a mating shaft from the slow closing hinge. The hinge shaft has at least one flat surface. The flange portion covers the panel around the socket.

16 Claims, 3 Drawing Sheets

FABRIC TREATMENT MACHINE HINGE SPACER

FIELD

The present disclosure relates to a hinge spacer and, more particularly, to a hinge spacer that receives a shaft of a slow close hinge for laundry machines or the like.

BACKGROUND

In current fabric treatment machines, slow close hinges require the shaft to be held in place so that the slow close mechanism can operate. If the shaft is inserted directly into a hole in the metal top panel, the connection is not strong enough to resist the high torque over the life of the unit. Additionally, the metal on metal contact will be noisy and will equate to a low quality experience for the customer.

Current styles of slow close hinges are secured into the top panel on its bottom side. This requires an additional component to connect the hinge mechanism to the lid. This type of hinge is more expensive and requires more assembly steps and also cannot be positioned inside the lid assembly. Alternatively, some machines utilize a plastic top panel. The plastic top panels can be built with posts for the hinge interface that provides the same functions. However, plastic top panels are more expensive than metal panels.

Accordingly, it would be desirable to eliminate the shortcomings of the prior art. The present disclosure provides a hinge spacer that is press fit into the top panel. The spacer includes a hole so that the shaft can be keyed and held in place to provide the slow close function. The spacer is manufactured from plastic materials that can withstand the high torque created by the slow close hinges. The spacers provide a location function to eliminate missed securement of the spacer within the panel.

SUMMARY

According to the present disclosure, a fabric treatment machine comprises a cabinet housing with a door or lid to enable access inside the cabinet. The fabric treatment components are positioned inside the cabinet and includes a drum, tub, and the like. A panel on the housing includes an opening to receive the door. At least one hinge spacer is coupled with the panel to receive a shaft of a slow close hinge of the door. The at least one hinge spacer includes a housing with a socket portion and a flange portion. The socket portion inserts into an aperture in the panel. The socket portion includes a parallelogram bore to receive a mating hinge shaft. The hinge shaft has at least one flat surface. The flange portion covers the panel aperture around the shaft.

The spacer housing has an elongated configuration with two ends. The bore is positioned at one of the ends. The spacer housing includes a positioning rib adjacent to the bore. The housing is manufactured from a plastic material such as PA66 with a high glass percentage. Two spacers are provided, one for each side of the door or lid. The two spacers are mirror images of one another and include a slanted surface to enable a pokayoke to prevent incorrect assembly.

A hinge spacer for a fabric treatment machine comprising a housing having a socket portion and a flange portion. The socket portion is for insertion into an aperture on a panel. The socket portion includes a parallelogram bore to receive a mating hinge shaft. The hinge shaft has at least one flat surface. The flange portion is designed to cover the aperture around the socket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
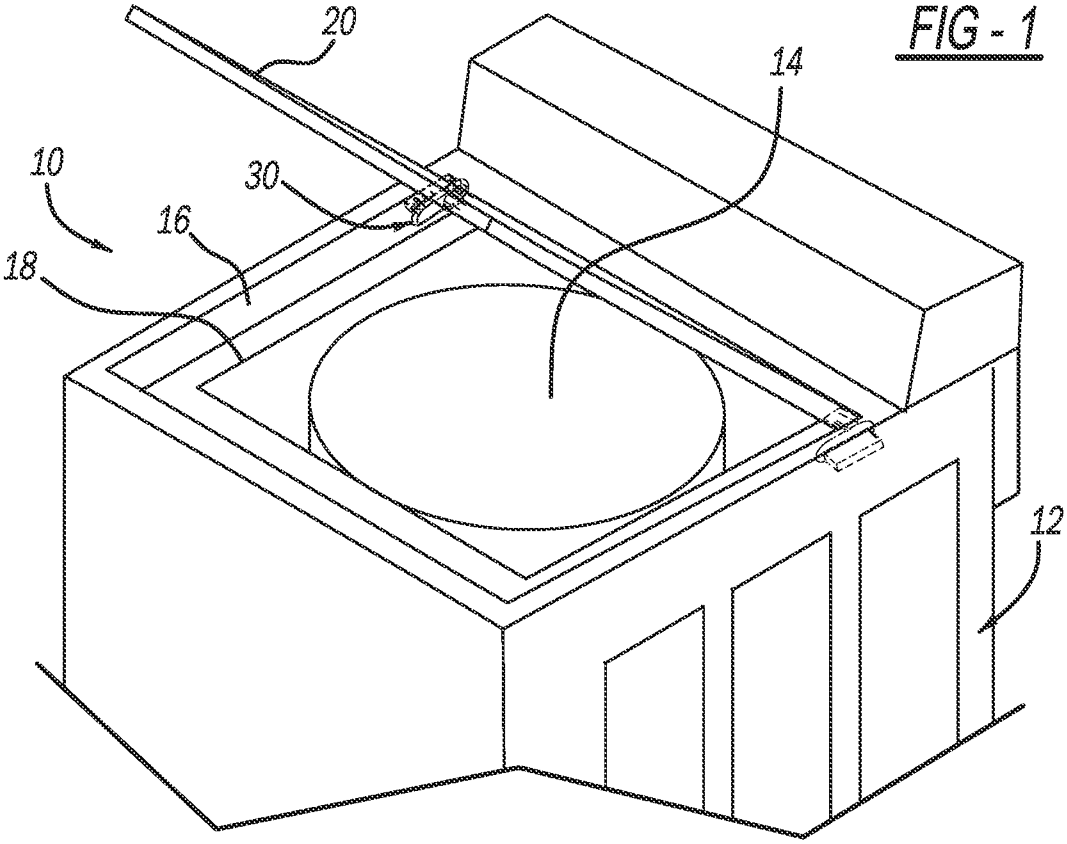
FIG. 1 is a perspective view of a fabric treatment machine in accordance with the present disclosure.
Figure 2:
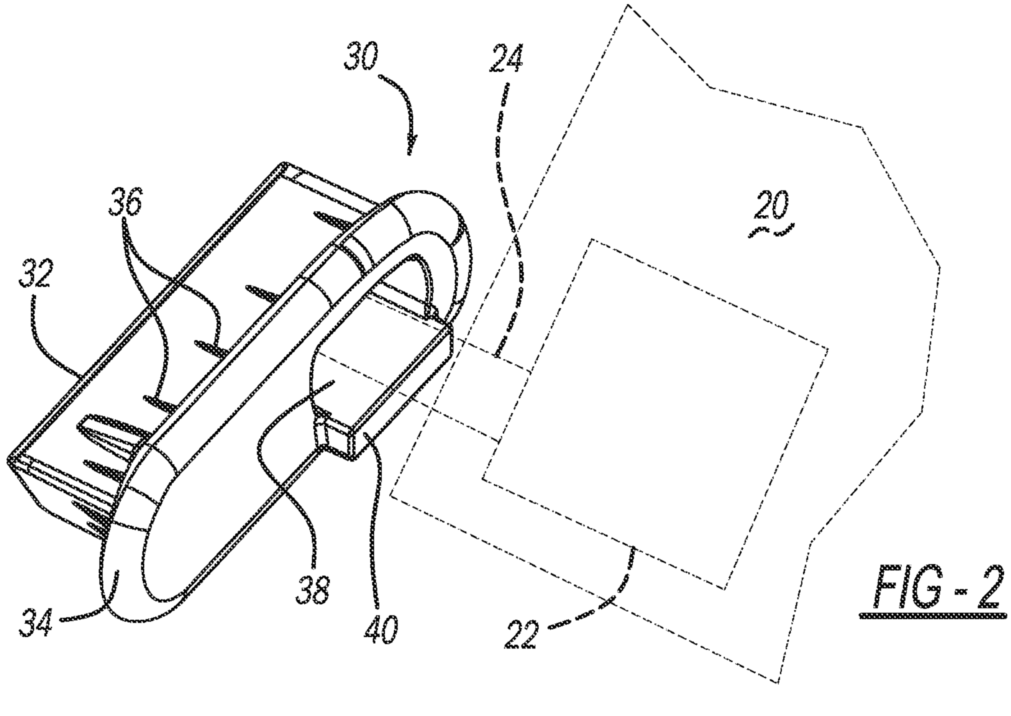
FIG. 2 is an enlarged perspective view of a hinge spacer.
Figure 3:
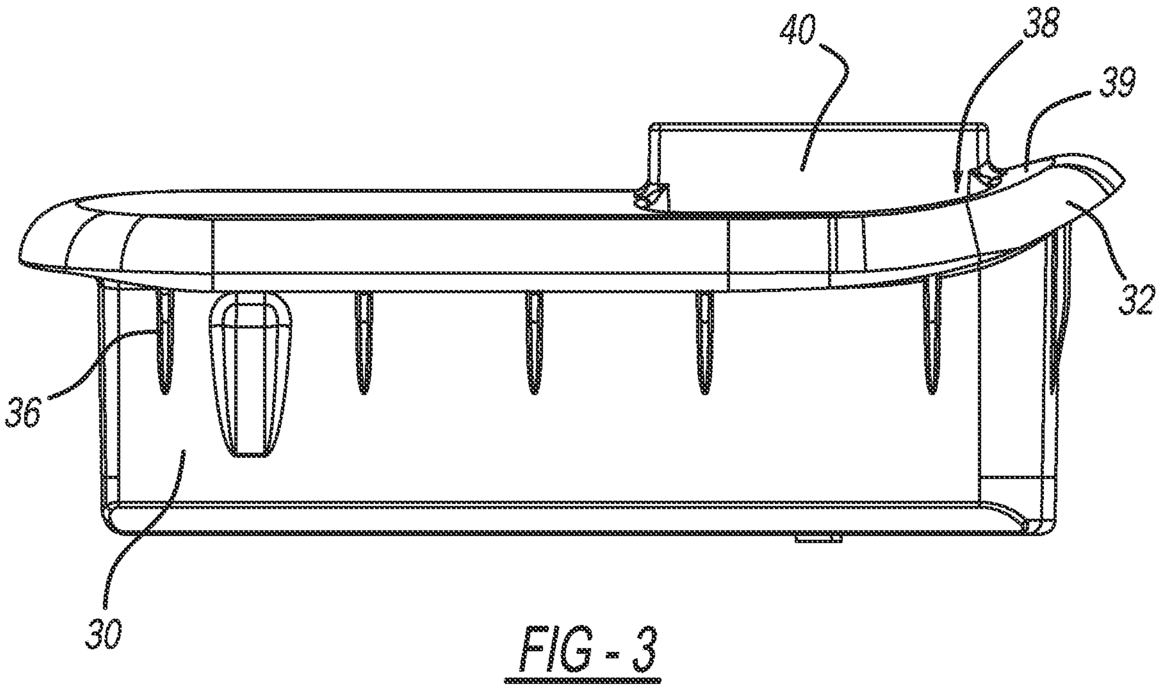
FIG. 3 is a side elevation view.
Figure 4:
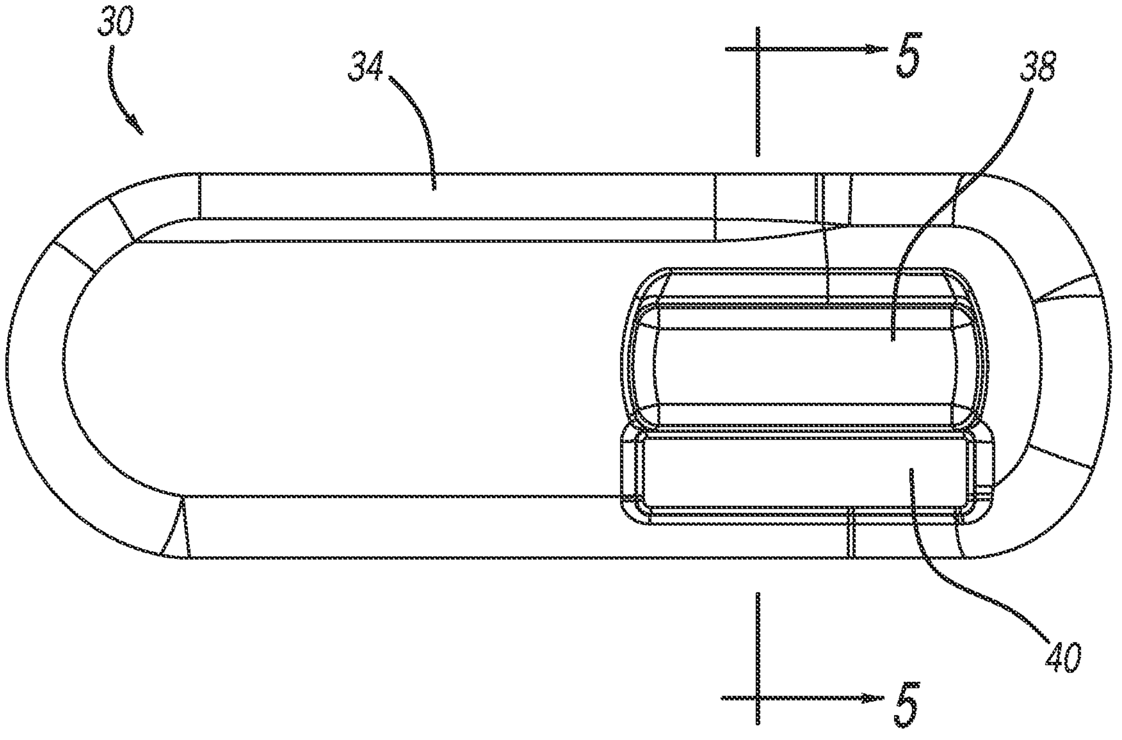
FIG. 4 is a front plan view of the spacer.
Figure 5:
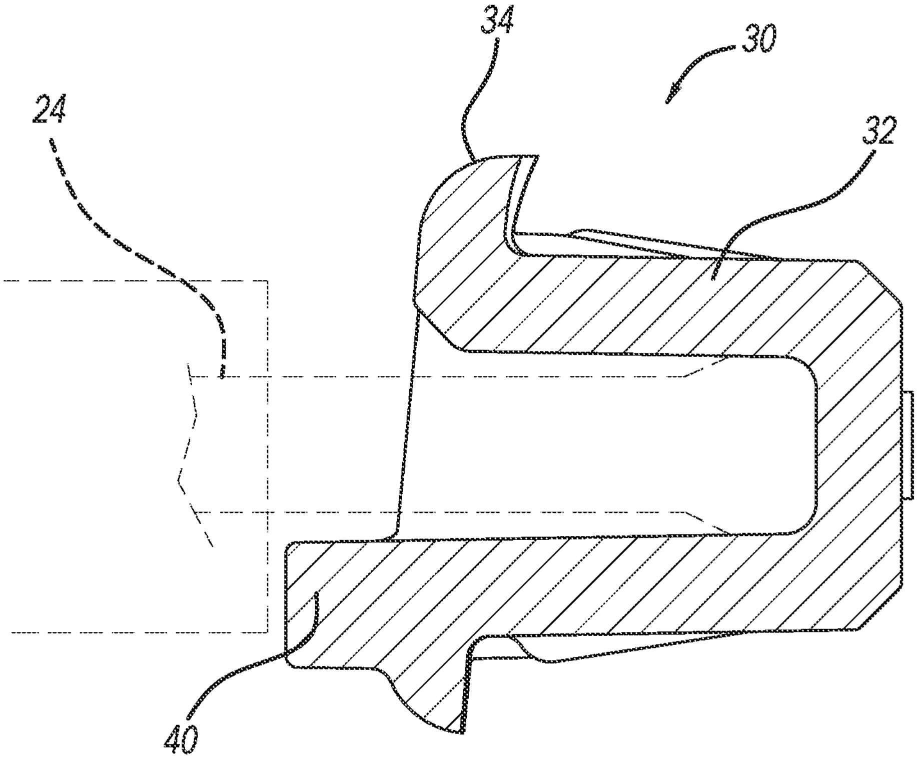
FIG. 5 is a cross-section view of FIG. 4 along line 5-5 thereof.

Turning to the figures, a fabric treatment machine is illustrated and designated with the reference numeral 10. The machine 10 includes a housing 12 that houses the treatment components such as a drum 14, a tub, washing circuit, or drying circuit or both. A top panel 16 includes an opening 18 to enable access into the drum 14. A door or lid 20 covers the opening 18.

The lid 20 includes a slow closing hinge 22 that includes a shaft 24. The shaft 24 is positioned into a hinge spacer 30. The hinge spacer 30 is secured in the panel 16 via an interference fit.

The hinge spacer 30 has an overall oblong shape. The hinge spacer 30 includes a socket 32 and a flange 34. The socket 32 includes a plurality of barbs 36 that contact the opening or aperture in the panel 16 to retain the hinge spacer 30 within the panel 16. The socket 32 includes a bore 38. The bore 38 is positioned on one end of the hinge spacer 30. The bore 38 has a parallelogram, preferably rectangular, shape to enable the hinge shaft 24 to be keyed and held in place to provide the slow close function. The bore 38 includes at least one flat wall that receives a mating flat wall of the shaft 24. Preferably, the bore includes two flat walls that mate with two flat walls on the hinge shaft 24.

The bore 38 is positioned at one end of the hinge spacer 30. Accordingly, this enables the plastic of the hinge spacer 30 to include a large contact surface to transmit the torque into the top panel 16. This also enables the hinge spacers 30 to be pokayoked so that the left and right sides are mirror images of each other and cannot be assembled incorrectly. The pokayoked is accomplished with a slanted surface 39 on a front of the hinge spacers 30.

A ledge 40 extends from the front of the hinge spacers 30 near the flange 34. The ledge 40 provides a seat for the hinge shaft 24. The ledge 40 is positioned at a bottom edge of the bore 38 such that it provides a surface to guide the insertion of the hinge shaft 24 into the bore 38. The ledge 40 helps to locate the lid 20 from left to right. It also provides a more consistent gap between the lid 20 and the top panel 16 as well as less side-to-side freedom of movement for the lid 20.

The flange 34 coves the opening in the panel 16. Thus, once the socket is pressed into the panel, the flange abuts the panel surface.

The hinge spacer 30 is manufactured from a plastic material. Generally, it is manufactured from a PA66 or PA6 material with a high glass fill percentage of about 40% to 60%. This provides toughness and withstands the high torque created by the hinge when it is moving during its slow close function. Additionally, the material is less brittle than other material options with high toughness. Thus, the hinge spacer 30 will be able to withstand higher loads without cracking. Also, the hinge spacer 30 will be able to withstand more lid opening and closing cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fabric treatment machine comprising:

a cabinet housing;

a lid enabling access inside the cabinet;

a drum positioned inside the cabinet housing;

a panel on the cabinet housing including an opening for receiving the lid;

at least one hinge spacer coupled with the panel for receiving a shaft of a slow closing a hinge for the lid; and the at least one hinge spacer including a socket portion and a flange portion, the socket portion is retained in an aperture in the panel via an interference fit, the socket portion including a bore having at least one flat side for receiving a mating shaft from the slow closing hinge, the hinge shaft having at least one flat surface, and the flange portion covering the aperture in the panel.

2. The fabric treatment machine of claim 1, wherein the hinge spacer has an elongated configuration with two ends, the bore positioned at one of the ends.

3. The fabric treatment machine of claim 1, wherein the hinge spacer includes a positioning ledge that extends from a front of the hinge spacer at a position adjacent to the bore such that the positioning ledge is configured to locate the lid from left to right, provide a consistent gap between the lid and the panel, and limit side-to-side movement of the lid.

4. The fabric treatment machine of claim 1, wherein the hinge spacer is manufactured from plastic.

5. The fabric treatment machine of claim 4, wherein the plastic is a PA66 material with a glass fill percentage of about 40 to 60 percent.

6. The fabric treatment machine of claim 1, wherein two hinge spacers are provided.

7. The fabric treatment machine of claim 6, wherein the hinge spacers are mirror images of one another.

8. The fabric treatment machine of claim 7, wherein the bore is positioned at one end of each of the hinge spacers and the hinge spacers include a slanted surface to provide a pokayoke to prevent incorrect assembly.

9. A hinge spacer assembly for a fabric treatment machine comprising:

at least one hinge spacer including a socket portion and a flange portion, the socket portion configured to be inserted into an aperture in a panel, the socket portion including a bore with at least one flat side for receiving a mating shaft from a slow closing hinge, the slow closing hinge including a shaft having at least one flat surface, and the flange portion configured to abut the panel, wherein the at least one hinge spacer includes a positioning ledge that extends from a front of the hinge spacer at a position adjacent to the bore to provide a seat for the hinge shaft.

10. The hinge spacer assembly of claim 9, wherein the hinge spacer has an elongated configuration with two ends, the bore positioned at one of the ends.

11. The hinge spacer assembly of claim 9, wherein the positioning ledge is positioned at a bottom edge of the bore and provides a surface to guide insertion of the hinge shaft into the bore.

12. The hinge spacer assembly of claim 9, wherein the hinge spacer is manufactured from plastic.

13. The hinge spacer assembly of claim 12, wherein the plastic is a PA66 material with a glass fill percentage of about 40 to 60 percent.

14. The hinge spacer assembly of claim 9, wherein two hinge spacers are provided.

15. The hinge spacer assembly of claim 14, wherein the hinge spacers are mirror images of one another.

16. The hinge spacer assembly of claim 15, wherein the bore is positioned at one end of each of the hinge spacers and the hinge spacers include a slanted surface to provide a pokayoke to prevent incorrect assembly.

* * * * *